United States Patent [19]
Jacob et al.

[11] Patent Number: 5,675,205
[45] Date of Patent: Oct. 7, 1997

[54] MODULE FOR CONTROLLERS AND BRUSH HOLDERS AND METHOD OF MANFACTURING IT

[75] Inventors: Wolfgang Jacob, Horb; Christian Greiner, Reutlingen, both of Germany

[73] Assignee: Robert Bosch GmbH, Stuttgart, Germany

[21] Appl. No.: 450,478

[22] Filed: May 26, 1995

[30] Foreign Application Priority Data

Jun. 1, 1994 [DE] Germany ............... 44 19 215.0

[51] Int. Cl.$^6$ ............... H01R 39/38; H02K 13/00
[52] U.S. Cl. ............... 310/239; 310/68 D; 310/68 R; 310/71; 310/239
[58] Field of Search ............... 310/239, 71, 68 D, 310/68 R

[56] References Cited

U.S. PATENT DOCUMENTS

| | | | |
|---|---|---|---|
| 3,538,362 | 11/1970 | Cheetham et al. | 310/68 R |
| 4,359,656 | 11/1982 | Fasterding et al. | 310/68 R |
| 4,504,752 | 3/1985 | Iwaki et al. | 310/68 R |
| 4,673,837 | 6/1987 | Gingerich et al. | 310/239 |
| 4,963,779 | 10/1990 | Lentino et al. | 310/71 |
| 5,245,241 | 9/1993 | Gotoh | 310/242 |
| 5,248,910 | 9/1993 | Yockey et al. | 310/68 R |
| 5,319,277 | 6/1994 | Materne et al. | 310/239 |
| 5,453,646 | 9/1995 | Gleixner et al. | 310/51 |
| 5,528,093 | 6/1996 | Adam et al. | 310/89 |

FOREIGN PATENT DOCUMENTS

| | | | |
|---|---|---|---|
| 1146208 | 10/1983 | Canada | 310/239 |
| A-57 003562 | 4/1982 | European Pat. Off. | 310/68 R |
| A-0 484 287 | 5/1992 | European Pat. Off. | 310/68 R |

*Primary Examiner*—Thomas M. Dougherty
*Assistant Examiner*—Elvin G. Enad
*Attorney, Agent, or Firm*—Michael J. Striker

[57] ABSTRACT

A module for an electronic circuit of chip or hybrid design, combined with a brush holder for generators in motor vehicles has connecting lines embedded between the electronic circuit, the carbon brushes and a plug-in terminal in a housing component made of insulating material. The circuit which is bonded or soldered to a bearing plate is surrounded, for the purpose of making contact with the contacting lines by a collar of the housing component which is closed by a lid. For good dissipation of heat and cost effective manufacture of this module, the bearing plate with the circuit is to be attached directly to the generator housing and the brush holder with its contact components for the brush terminals is also to be formed on in one piece to the housing component.

19 Claims, 2 Drawing Sheets

MODULE FOR CONTROLLERS AND BRUSH HOLDERS AND METHOD OF MANFACTURING IT

BACKGROUND OF THE INVENTION

The invention is based on a module for an electronic circuit, in particular controller circuit, of chip or hybrid design, combined with a brush holder for electrical machines, preferably generators for motor vehicles.

CA-PS 1 146 208 has already disclosed how the housing for a controller circuit of hybrid design is combined with the brush holder of a generator for motor vehicles in such a way that the contact components for the carbon brushes and for the plug-in contact terminals are embedded as lines into the body of insulating material of a housing component to such a depth that only the contacting areas of these lines are exposed. Furthermore, it is disclosed in this publication how the hybrid circuit is attached in a planar fashion on a cooling plate and electrically connected to the respective contacting areas of the lines. In this arrangement, the hybrid circuit is surrounded by a collar of the body of insulating material which is attached to the cooling plate and is electrically connected to the contacting areas, projecting into the opening of the collar, of the lines, the opening of the collar being closed with a lid.

In this solution it is disadvantageous that the module which is formed from a plug-in terminal, brush holder, controller circuit and connecting lines requires additional attachment flanges with which the module is attached to the slip ring-end of the generator. These attachment flanges must be additionally inserted into the injection molding die of the plastic housing component. In addition, the cooling plate with the controller circuit is securely riveted on the opening of the collar of the housing component so that the waste heat generated in the controller circuit is not dissipated from there via the attachment clips but rather exclusively by means of cooling air. Furthermore, the brush holder is manufactured separately in this publication.

SUMMARY OF THE INVENTION

Accordingly, it is an object of the present invention to provide a module consisting of a brush holder and an electric circuit sampler, which improves the dissipation of waste heat.

In keeping with these objects and with others which will become apparent hereinafter, one feature of the present invention resides, briefly stated, in a module for an electronic circuit of chip or hybrid design, combined with a brush holder for electrical machines, preferably generators for motor vehicles, the contact components of the circuit for the carbon brushes and terminals being embedded as connecting lines in a housing component, consisting of insulating material, with the exception of their contacting areas, the electronic circuit being preferably bonded securely or soldered as controller circuit onto an electrically conductive bearing plate at ground potential, being surrounded by a collar of the housing component which is attached to the bearing plate and being connected to the contacting areas, projecting into the opening of the collar, of the connecting lines, and, in addition, the opening of the collar being closed with a lid, wherein the bearing plate is to be attached to the housing of the electrical machine with attachment means in order to dissipate heat and the brush holder is to be formed on in one piece with its contact components for the brush terminals to the housing component consisting of insulating material.

When the module is designed in accordance with the present invention it has the advantage that the brush holder is immediately also formed on to the housing component which directly surrounds the electronic circuit, and that the attachment of this module to the machine housing can be made directly via the bearing plate for the electronics so that via its attachment means it can transmit the waste heat of the electronic circuit to the electrical machine. By virtue of the fact that the bearing plate 14 is built on to a generator housing, the said bearing plate forms a heat sink for the controller circuit 11, which heat sink promotes the dissipation of heat from the circuit 11.

It is particularly advantageous here if the housing component on the one hand and the bearing plate on the other are prefabricated independently of one another, and thus cost-effectively, as two units and finally bonded to one another to form the module. A further advantage is that the electronic circuit of chip or hybrid design is surrounded by the plastic component with the formed-on brush holder without an additional housing.

In accordance with another feature of the present invention, a method for manufacturing a module is proposed, wherein the housing component with the connecting lines embedded therein on the one hand and the bearing plate with the bonded-on or soldered-on circuit of chip or hybrid design on the other are initially bonded to one another as prefabricated units, in that, afterwards, the electric circuit with the contacting areas of the connecting lines are connected by means of bonding wires, wherein the opening of the collar of the housing component is then at least partially filled with sealing compound and finally closed tight with the lid.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 2 shows the cross-section through this module along II—II in FIG. 1 with the lid bonded on;

DESCRIPTION OF THE PREFERRED EMBODIMENTS

Figure 1:
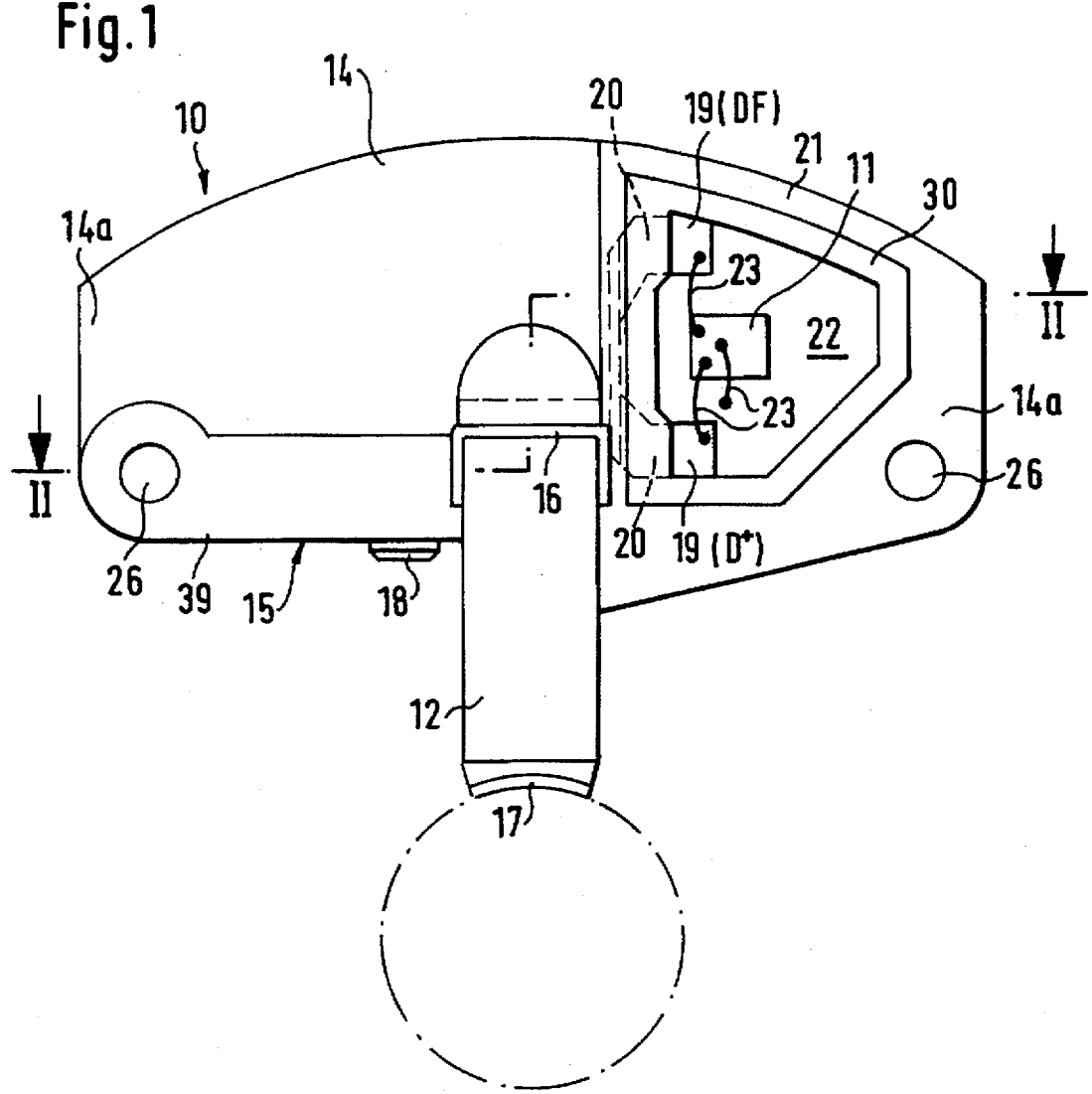
FIG. 1 shows the module, according to the invention, of a brush holder with an electronic control circuit of chip design with the lid removed in a plan view on an enlarged scale.
Figure 2:
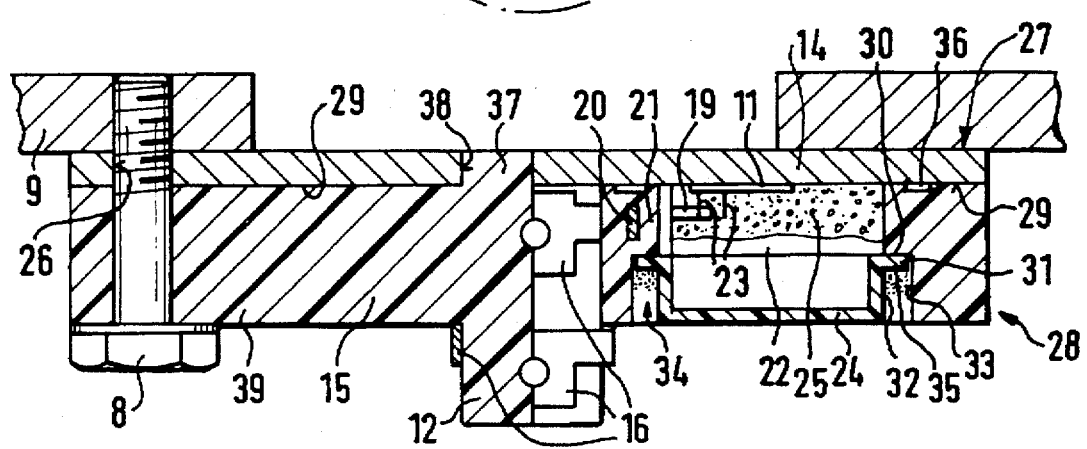
Figure 3:
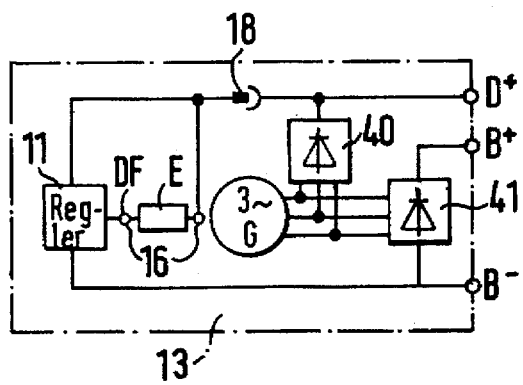
FIG. 3 shows the circuit diagram of a three-phase generator with controller and rectifier unit.

FIGS. 1 and 2 show a module 10 with an electronic controller circuit 11 and a brush holder 12 of a three-phase generator 13, illustrated in FIG. 3 in a circuit diagram, for motor vehicles. The controller circuit 11 is bonded or soldered as an integrated circuit chip directly on an electrically conductive bearing plate 14, consisting for example of aluminum, this bearing plate 14 being at ground potential. The brush holder 12 is integrated in a housing component 15 which consists of insulating material and in which contact components 16 for the carbon brushes 17 and a pressure contact terminal 18 and terminals 19 for the controller circuit 11 as connection line 20 are embedded in the insulating material of the housing component 15 with the exception of these areas 16, 18, 19. The controller circuit 11 is surrounded by a collar 21 of the housing component 15 which is attached to the bearing plate 14, the contacting areas 19 of the connecting lines 20 projecting into the opening 22 of the collar. Within the opening 22 of the collar, the controller circuit 11 is connected by means of bonding wires 23 to the two contacting areas 19 on the one hand and to the ground potential of the bearing plate 14 on the other. In addition, the opening 22 of the collar is closed, according to FIG. 2, with a lid 24 manufactured from plastic after the opening 33 of the collar has been filled with sealing compound 25 to above the contacting areas 19 or above the bonding wires 23.

The bearing plate 14 is of elongated and partially oval construction and has one attachment hole 26 at each of its two outer areas 14a so that it is screwed tight using screws 8 to the housing flange 9 of the three-phase generator 13 and thus to ground potential. As a result, the waste heat produced in the controller circuit 11 during operation is transmitted via the bearing plate 14 both to the cooling air in the region of this module 10 and via the support on the housing flange of the generator 13.

For a cost-effective production of a functionally reliable module 10, the bearing plate 10 forms with the integrated circuit chip of the control circuit 11 a first prefabricated unit 27. The housing component 15 which is injection-molded from insulating material in an injection molding die, with the connecting lines 20 as insertion components, forms a second prefabricated unit 28. Both prefabricated units 27 and 28 are bonded to one another over large areas of their supporting surfaces 29. Subsequently, contact is made between the integrated circuit chip and the contacting areas 19 of the connecting lines 20 by means of the bonding wires 23 and after this the sealing compound 25 is filled into the opening 22 of the collar. Finally, the opening 22 of the collar is bonded in a sealed manner to the lid 24. In order to attach the lid 24 to the collar 21 in a moisture-proof way without increasing the overall height of the module 10, the collar 21 of the housing component 15 is provided at the edge of the opening 22 of the collar with a peripheral, outwardly widened shoulder 30 on which the pot-shaped lid 24 fits with a peripheral, outwardly directed edge 31. As a result, a peripheral gap 34 which is filled at least partially with an adhesive 35 is formed between the wall 32 of the lid 24 and the wall 33 of the widened shoulder 30. In addition, an annular groove 36 which is filled with adhesive for reliably sealing the integrated circuit chip of the controller circuit 11 is located on the side of the collar 21 facing the bearing plate 14. In order to prefix the two prefabricated units 27 and 28, the housing component 15 is provided with a projection 37 which engages in a correspondingly shaped opening 38 of the bearing plate 14.

In addition, it can be seen in FIG. 1 that the brush holder 12 is arranged symmetrically with respect to the attachment holes 26 on the front side of the bearing plate in the central area. On the adjacent right half of the bearing plate 14, the electronic circuit 11 is arranged with the housing collar 21 surrounding it and on the left half of the bearing plate 12 only a bearing arm 39, projecting over the attachment hole 26, of the housing component 15 is bonded to the bearing plate 14 so that in this half the bearing plate 14 remains essentially free in order to dissipate heat to cooling air. Furthermore, on this left half of the bearing plate 14 the housing component 15 is provided, as well as with the brush holder 123, with the terminal 18 for the voltage supply of the computer 11.

From the circuit diagram according to FIG. 3, it is clear, in conjunction with FIG. 1, that the controller circuit 11 is connected via its terminal DF and via the one carbon brush 17 of the brush holder 12 to the exciter winding E of the three-phase generator 13, the other end of which exciter winding E is connected on the one hand to the terminal 18 for the voltage supply of the controller 11 via the second carbon brush 18 of the brush holder 12 and on the other hand to the D+ terminal 19 of the controller 11. Furthermore, the controller 11 is connected to the ground potential of the terminal B— via the bearing plate 14. The connecting lines 20 required for the connection of D+ and DF are injection-molded here in the hosing 15, whereas the three-phase stator windings of the generator 13 are connected on the one hand via a rectifier unit 40 to the D+ terminal 18 and on the other hand via a bridge rectifier 41 to the terminals B+ and B— for the connection of an accumulator battery.

Figure 4:
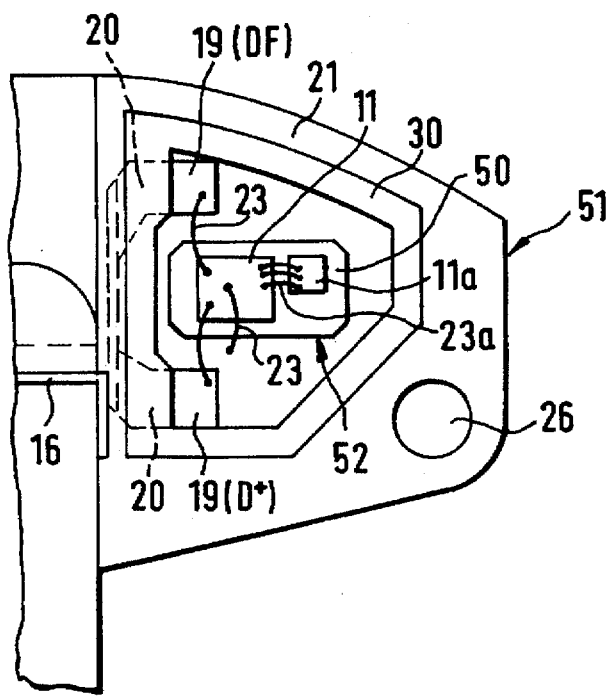
FIGS. 4 and 5 show a further exemplary embodiment of the module.
Figure 5:
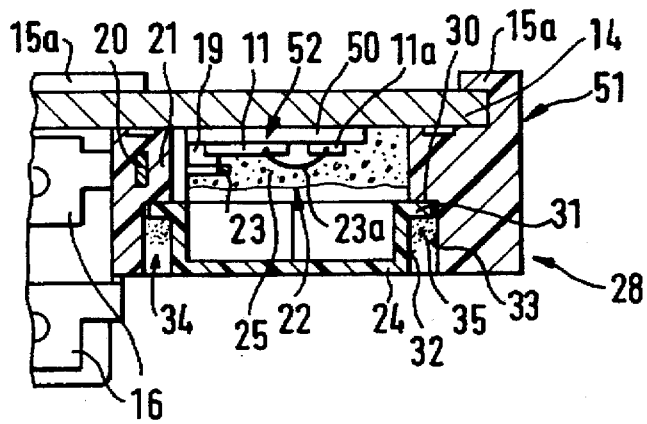

FIGS. 4 and 5 show a second exemplary embodiment of the module according to the invention, FIG. 4 corresponding to the right half of FIG. 1, and FIG. 5 corresponding to the right half of FIG. 2. Here, identical components are provided with identical reference numbers. In a modification of the first exemplary embodiment, the monolithic chip 11 is bonded tight or soldered or welded here on the bearing plate by means of a metal intermediate carrier 50. Furthermore, a second integrated circuit chip 11a for a further electronic circuit component is also bonded and/or soldered onto the intermediate carrier 15, the said circuit component being wired to the chip 11 by means of bonding wires 23a. However, instead of the integrated circuit chips, circuit hybrids may also be provided so that the electronic circuit consisting of a total of several components of integrated circuit chip and/or hybrid design is attached to the bearing plate 14 directly and/or by means of the intermediate carrier 50.

As a further modification with respect to the first exemplary embodiment there is provision according to FIG. 5 for the bearing plate 14 also to be injection-molded into the housing component 15 made of insulating material in that the central opening 38 of the bearing plate 14 and its outer edge, provided the latter does not fit on the housing flange 9 of the three-phase generator 13, grips the bearing plate 14 with an edge 15a, made of insulating material, of the housing component 15.

The module of this exemplary embodiment is produced by the connecting lines 20 and the bearing plate 14 being initially inserted in an injection molding die in order to produce the housing component 15a so that the housing component 15 forms with the connecting lines embedded therein and the bearing plate 14 injection-molded onto the edges 15a a first prefabricated module 51. The circuit with the two chips 11 and 11a is initially bonded or soldered onto the intermediate carrier 50 and then they are wired to one another by means of the bonding wires 23a so that a second prefabricated unit 52 is produced. Afterwards, the intermediate carrier 50 with the circuit 11, 11a is inserted into the lid opening 22 and bonded, soldered or welded to the bearing plate 14, and subsequently the circuit 11, 11a is connected by means of the remaining bonding wires 23 to the contacting areas 19 of the connecting lines 20. Then, the opening 22 of the collar is filled at least partially with sealing compound 25 and finally sealed tight with the lid 24.

For both exemplary embodiments it is essential to the invention that the brush holder 12 be formed with its contact components 16 for the brush terminals in one piece onto the housing component 15 consisting of insulating material so that special components are not required for this.

Furthermore, for better dissipation of the waste heat of the electronic circuit 11 its bearing plate 14 is to be attached directly to the housing 9 of the generator using screws 26 or other attachment means. The module 10 according to the invention ensures that the electronic circuit and the connecting lines 20 are accommodated between the electronics, the brush holder and the terminal 18 protected against external influences, it being possible to attach a circuit hybrid on the bearing plate 14 instead of an integrated circuit. The connecting lines 20 are manufactured here preferably as busbars in the form of metal punched components which are encapsulated by injection molding as insertion components in an injection molding die by the insulating material of the housing component 15. With suitable arrangement, as well as the controller circuit a further electronic circuit can be integrated, it being possible for the said electronic circuit to carry out a different function for example in the event of two vehicle electrical systems being disconnected. Here, semiconductor circuits can also be soldered or bonded onto for example two base plates if the base plates of these circuits are to have different potentials due to the technology or circuitry. Additional connections to the vehicle electrical system or generator are possible without difficulty by the corresponding terminals of the connection line insertion component being led out of the housing component 15 and constructed, together with the correspondingly shaped insulating material, as a plug. The carbon brushes 17 can be installed here either before or even after the installation of the two prefabricated units 27, 28 into the brush holder 12.

It will be understood that each of the elements described above, or two or more together, may also find a useful application in other types of constructions and methods differing from the types described above.

While the invention has been illustrated and described as embodied in a module for controllers and brush holders and method for manufacturing it, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A module for an electronic circuit of chip or hybrid design, combined with a brush holder for electrical machines, comprising a housing component consisting of insulating material and having a collar with an opening; a brush holder with carbon brushes; a controller circuit for said carbon brushes and having a contact component embedded in said housing component with the exception of contacting areas of said contact component which are free of the insulating material of said housing component while all remaining areas of said contact component are embedded in the insulating material of said housing component; an electrically conductive bearing plate, said controller circuit being fixed as a controller circuit on said bearing plate at ground potential and surrounded by said collar of said housing component, said housing component being attached to said bearing plate and being connected to said contact areas, said contacting areas projecting into said opening of said collar; a lid closing said opening of said collar; and attachment means for attaching said bearing plate to said housing component in order to dissipate heat, said brush holder together with its contact components for terminals of said carbon brushes being formed of one piece with said housing component composed of insulating material.

2. A module as defined in claim 1; and further comprising a sealing compound which fills said opening of said collar of said housing component at least above said contacting areas.

3. A module as defined in claim 1, wherein said opening of said collar of said housing component has a peripheral, outwardly widened shoulder, said lid being pot-shaped and having a peripheral, outwardly directed edge with which said lid fits on said shoulder.

4. A module as defined in claim 3; and further comprising an adhesive which at least partially fills a peripheral gap formed between a wall of said lid and a wall of said widened shoulder.

5. A module as defined in claim 1, wherein said housing component with said contact components as insertion components form one prefabricated unit while said bearing plate with said attachment means and said controller circuit form another prefabricated unit, said prefabricated units being bonded with one another over an area.

6. A module as defined in claim 5, wherein said attachment means are formed as attachment holes.

7. A module as defined in claim 5; and further comprising bonding wires which connect said controller circuit to said contacting areas of said connecting lines.

8. A module as defined in claim 5; and further comprising means for prefixing said prefabricated units and including a projection provided on said housing component and an opening provided in said bearing plate so that said projection engages in said opening.

9. A module as defined in claim 1; and further comprising an intermediate carrier which together with said controller circuit forms a monolithic chip attached to said bearing plate.

10. A module as defined in claim 1, wherein said controller circuit has a plurality of components wires to one another by bonding connections and is attached to said bearing plate.

11. A module as defined in claim 10, wherein said components are components of an integrated circuit.

12. A module as defined in claim 10, wherein said components are elements of a hybrid design.

13. A module as defined in claim 10, wherein said controller circuit is attached to said bearing plate directly.

14. A module as defined in claim 10; and further comprising a metal intermediate carrier with which said controller circuit is attached to said bearing plate.

15. A module as defined in claim 1, wherein said bearing plate is injection molded into said housing component of insulating material.

16. A module as defined in claim 1, wherein said contact components include a connecting line which connects said controller circuit with said carbon brushes.

17. A module as defined in claim 1, wherein said contact components include one of said contacting areas.

18. A module for an electronic circuit of chip or hybrid design, combined with a brush holder for electrical machines, comprising a housing component consisting of insulating material and having a collar with an opening; a brush holder with carbon brushes; a controller circuit for said carbon brushes and having a contact component embedded in said housing component with the exception of contact areas of said contact component which are free of the insulating material of said housing component while all remaining areas of said contact component are embedded in the insulating material of said housing component; an electrically conductive bearing plate, said controller circuit being fixed as a controller circuit on said bearing plate at ground potential and surrounded by said collar of said housing component, said housing component being attached to said bearing plate and being connected to said contact areas, said contact areas projecting into said opening of said collar; a lid closing said opening of said collar; and attachment means for attaching said bearing plate to said housing component in order to dissipate heat, said brush holder together with its contact components for terminals of said carbon brushes being formed of one piece with said housing component composed of insulating material, said controller circuit with said collar surrounding it being arranged on a front side of said bearing plate in a central area of the brush holder and next to them on one half of said bearing plate, another half of said bearing plate remaining essentially free in order to dissipate heat to cooling air.

19. A module as defined in claim 18, wherein on the other half of said bearing plate said housing component has, in addition to said brush holder, a terminal for supplying voltage to said controller circuit.

* * * * *